(12) United States Patent
Chao (10) Patent No.: US 9,239,724 B2
(45) Date of Patent: Jan. 19, 2016

(54) COMPUTER DEVICE AND BOOT METHOD THEREOF

(71) Applicant: Wistron Corporation, New Taipei (TW)

(72) Inventor: Shu-Lin Chao, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 172 days.

(21) Appl. No.: 14/064,675

(22) Filed: Oct. 28, 2013

(65) Prior Publication Data

US 2014/0201514 A1 Jul. 17, 2014

(30) Foreign Application Priority Data

Jan. 16, 2013 (TW) .............................. 102101677 A (51) Int. Cl.
*G06F 9/44* (2006.01)
(52) U.S. Cl.
CPC ............ *G06F 9/4403* (2013.01); *G06F 9/4411* (2013.01); *G06F 9/4418* (2013.01)
(58) Field of Classification Search
CPC .... G06F 9/4403; G06F 9/4418; G06F 9/4411
See application file for complete search history.

(56) References Cited

U.S. PATENT DOCUMENTS

| | | | | |
|---|---|---|---|---|
| 6,092,135 | A * | 7/2000 | Kwon | 710/104 |
| 6,519,698 | B1 * | 2/2003 | Leyda et al. | 713/2 |
| 6,697,940 | B1 * | 2/2004 | Perez et al. | 713/1 |
| 6,721,885 | B1 * | 4/2004 | Freeman et al. | 713/2 |
| 7,257,702 | B2 * | 8/2007 | Yamada et al. | 713/2 |
| 2007/0157015 | A1 | 7/2007 | Swanson et al. | |
| 2011/0252225 | A1 | 10/2011 | Liu et al. | |

FOREIGN PATENT DOCUMENTS

TW 201142710 A 12/2011

OTHER PUBLICATIONS

Office Action dated Dec. 24, 2014 issued by Taiwan Patent Office.

* cited by examiner

*Primary Examiner* — M Elamin
(74) *Attorney, Agent, or Firm* — Rabin & Berdo, P.C.

(57) ABSTRACT

A computer device and a boot method thereof are provided. The method is applicable to a computer with a Basic Input Output System (BIOS) and an Operating System (OS). The computer includes a chassis and a memory. In the boot method, after the computer is started, it is judged whether the chassis is opened in an interval from the last boot time to the current boot time. If the chassis is not opened in the interval from the last boot time to the current boot time, the BIOS does not detect hardware elements connected to the computer to obtain setting and parameter values of each hardware element, but reads directly the setting and parameter values of each hardware element that are stored in the memory last time, initializes each hardware element, transmits the setting and parameter values to the OS, and executes the OS to complete the boot process.

10 Claims, 9 Drawing Sheets

COMPUTER DEVICE AND BOOT METHOD THEREOF

CROSS-REFERENCES TO RELATED APPLICATIONS

This non-provisional application claims priority under 35 U.S.C. §119(a) on Patent Application No. 102101677 filed in Taiwan, R.O.C. on 2013, Jan. 16, the entire contents of which are hereby incorporated by reference.

BACKGROUND

1. Technical Field

The present invention relates to a computer device and a boot method thereof, and in particular, to a computer device and a boot method thereof capable of shortening the boot time.

2. Related Art

Once a computer is started, a Basic Input/Output System (BIOS) in the computer executes a series of instructions, such as detecting basic hardware elements mounted on a main board, reading information in a memory and judging whether the operation is normal, and detecting information of apparatuses connected to connection ports of the computer main board, and then stores and displays the information on a display screen, for a user to learn about the current state of the computer. If the operation is normal, the BIOS searches for an Operating System (OS) stored in a storage device, and starts the OS to complete the boot process.

In a normal use state of a desktop computer, a notebook computer, or other handheld devices, a hardware unit is rarely changed in a boot interval. In a process from starting the device to displaying an OS execution image, the device is set, before being delivered from the factory, so that the instructions of the BIOS in the computer must all be executed each time when the device is booted. As a result, it takes a lot of time to perform hardware scanning and detection, so that the boot time is longer than that acceptable to a user, and the start speed of the computer is limited and cannot be effectively increased.

SUMMARY

A computer device and a boot method thereof are provided. The method is applicable to a computer with a BIOS and an OS. The computer includes a chassis and a memory. The boot method of the computer system includes: after the computer is started, judging whether the chassis is opened in an interval from the last boot time to the current boot time. If the chassis is opened in the interval from the last boot time to the current boot time, the BIOS detects hardware elements connected to the computer to obtain setting and parameter values of each hardware element, initializes each hardware element, and stores the setting and parameter values of each hardware element in the memory. Then, the BIOS transmits the setting and parameter values of each hardware element to the OS, and executes the OS to complete the boot process.

If the chassis is not opened in the interval from the last boot time to the current boot time, the BIOS does not detect the hardware elements connected to the computer to obtain the setting and parameter values of each hardware element, but reads the setting and parameter values of each hardware element that are stored in the memory last time, initializes each hardware element, transmits the setting and parameter values of each hardware element to the OS, and executes the OS to complete the boot process.

In order to change the hardware element mounted on a main board of the computer, it is necessary to open the chassis to implement the change. Consequently, if the chassis is not opened in an interval when the computer is booted twice, it is considered that the hardware element is not changed. In this case, the setting and parameter values of each hardware element that are recorded during the last boot time may be read directly, and it is not necessary to re-scan and re-detect the hardware unit, in order to shorten the boot time.

A BIOS marking method of a computer system is provided, which is applicable to a computer with a BIOS, the computer including a memory. The BIOS marking method of the computer system includes: after the computer is started, judging whether the setting of a hardware element in the BIOS is changed, and if the setting of the hardware element is changed, the BIOS writing marking information corresponding to the hardware element in the memory.

In a normal use state, the BIOS is rarely changed. Even if a setting interface of the BIOS is entered, it is unnecessary to change the setting and parameter values of the hardware element. However, after withdrawing from the setting interface of the BIOS and re-entering a boot process, it usually takes a lot of time to perform hardware re-scanning and re-detection, so that the boot time is longer than that acceptable to a user, and the start speed of the computer is limited and cannot be effectively increased. If the marking information corresponding to the changed hardware element is written into the memory through the BIOS marking method, when a boot process is re-entered, the time spent in scanning and detecting all the hardware elements by the BIOS is reduced, in order to shorten the boot time.

A boot method of a computer system is provided, which is applicable to a computer with a BIOS and an OS on the basis of a BIOS marking method, the computer including a memory. The boot method of the computer system includes: after entering a boot process, judging whether the memory stores marking information. If marking information is written into the memory, the BIOS detects a hardware element corresponding to the marking information to obtain setting and parameter values of the hardware element, initializes the hardware element, and stores the setting and parameter values of the hardware element in the memory. For the hardware element not corresponding to the marking information, the BIOS initializes the hardware element by using the setting and parameter values of the hardware element that are stored in the memory last time, transmits the setting and parameter values of the hardware element to the OS, and executes the OS to complete the boot process.

If no marking information is written into the memory, the BIOS initializes the hardware element by using the setting and parameter values of the hardware element that are stored in the memory last time, transmits the setting and parameter values of the hardware element to the OS, and executes the OS to complete the boot process.

If the marking information corresponding to the changed hardware element is written into the memory through the BIOS marking method, when a boot process is entered, only the changed hardware element is detected, thereby shortening the boot time.

BRIEF DESCRIPTION OF THE DRAWINGS

The present invention will become more fully understood from the detailed description given herein below for illustration only, and thus not limitative of the present invention, wherein.

DETAILED DESCRIPTION

Figure 1:
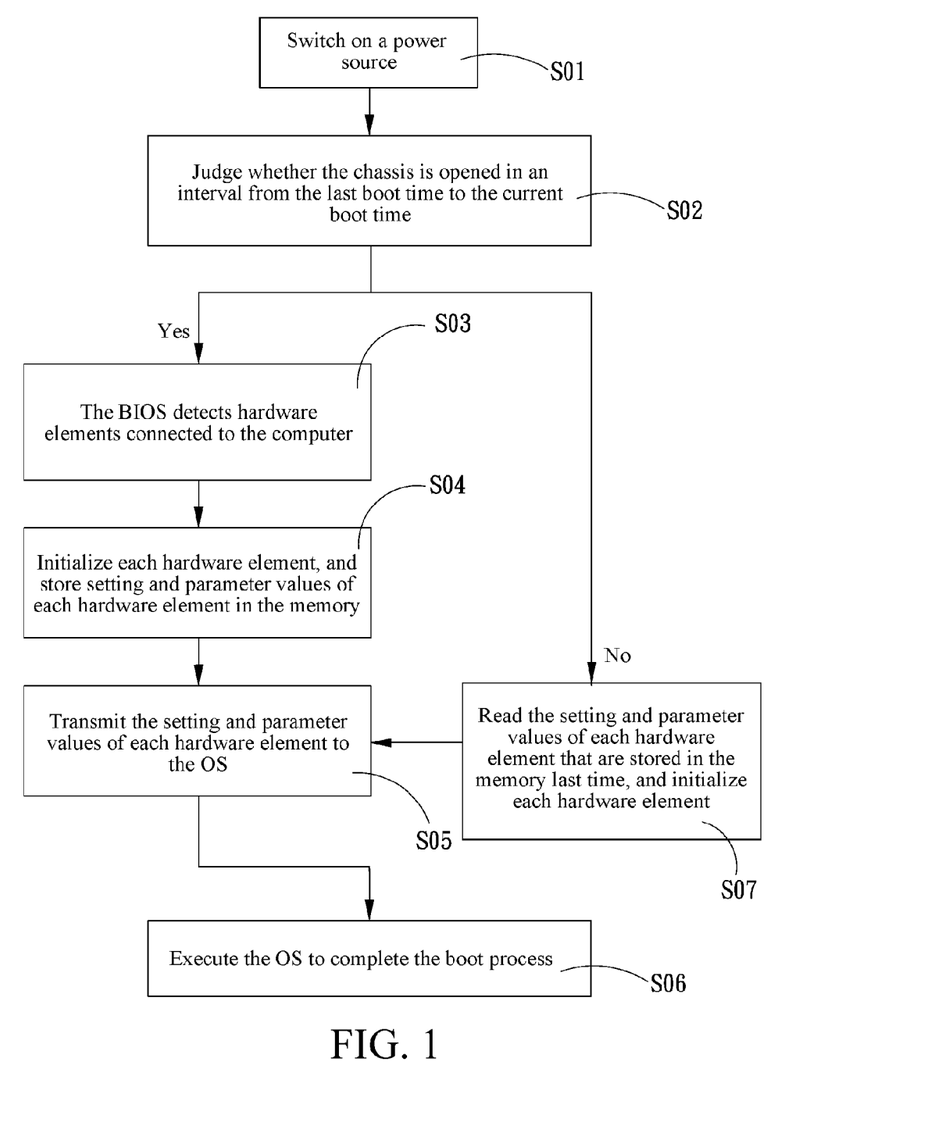
FIG. 1 is a flow chart of a boot method of a computer system according to a first embodiment of the present invention.
Figure 2:
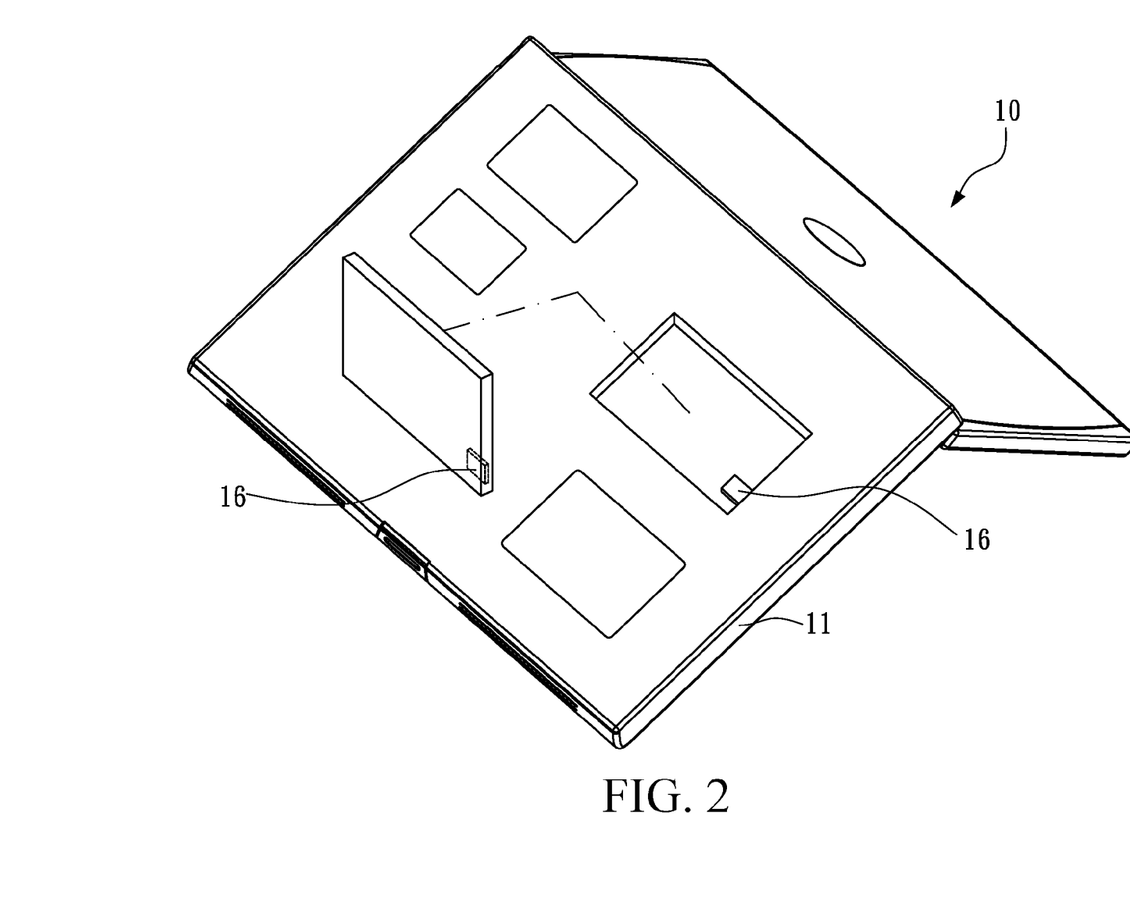
FIG. 2 is a rear view of a computer according to the first embodiment of the present invention.
Figure 3:
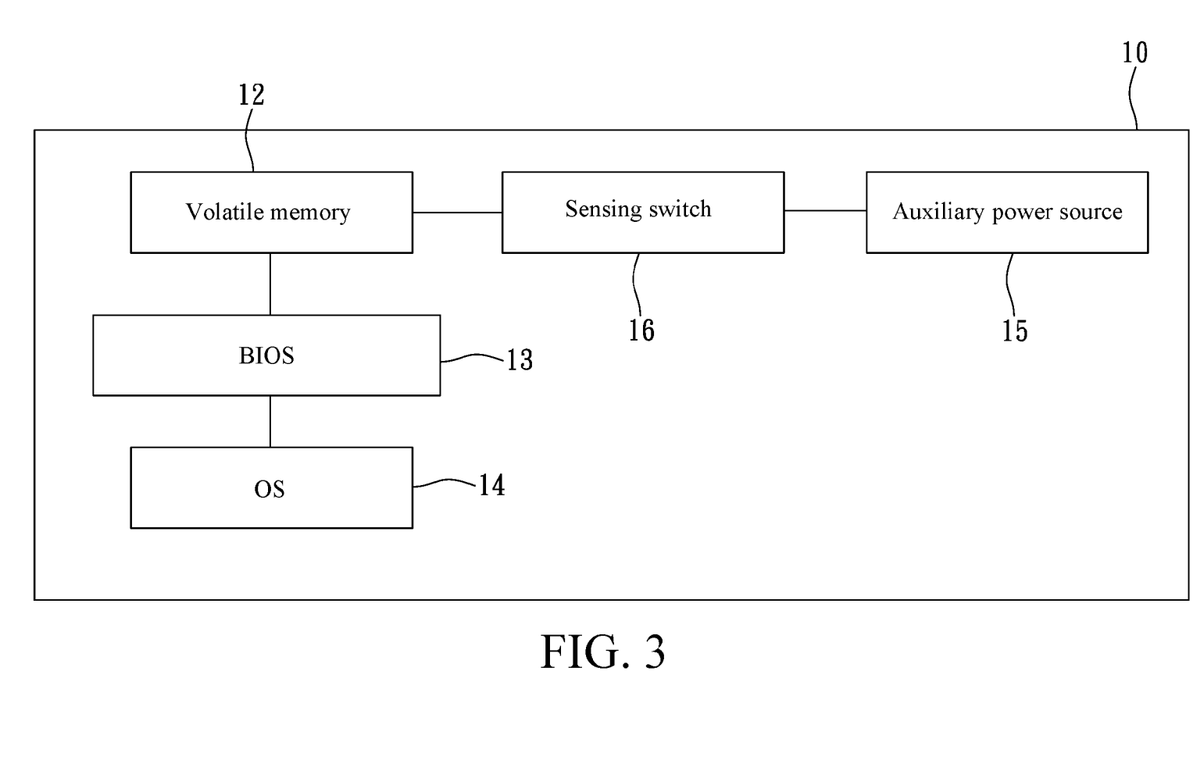
FIG. 3 is a schematic architectural view of the computer according to the first embodiment of the present invention.

FIG. 1 is a flow chart of a boot method of a computer system according to a first embodiment of the present invention, FIG. 2 is a rear view of a computer, and FIG. 3 is a schematic architectural view of the computer. Please refer to FIG. 1 to FIG. 3, in which the disclosed method is applicable to a computer 10 with a BIOS 13 and an OS 14, the computer 10 including a chassis 11, a memory, and an auxiliary power source 15. The method includes the following steps.

Step S01: Switch on a power source.

A power button of the computer is pressed to switch on the power source, so that the power source supplies power to each hardware apparatus for operation.

Step S02: Judge whether the chassis is opened in an interval from the last boot time to the current boot time.

After the power source is switched on, the computer 10 judges whether the chassis 11 is opened in the interval from the last boot time to the current boot time. If the chassis 11 of the computer 10 is opened in the interval from the last boot time to the current boot time, Step S03 is performed. If the chassis 11 of the computer 10 is not opened in the interval from the last boot time to the current boot time, Step S07 is performed.

Step S03: The BIOS detects hardware elements connected to the computer.

If the chassis 11 is opened in the interval from the last boot time to the current boot time, no matter whether the hardware element in the chassis 11 is changed or not, the BIOS 13 detects each hardware element connected to the computer 10. Here, the detection executed by the BIOS is a Power-on System Test (POST), including: detecting information about at least one Random Access Memory (RAM) connected to the computer 10, or detecting information about each apparatus connected to the computer 10.

Step S04: Initialize each hardware element, and store setting and parameter values of each hardware element in the memory.

After Step S03 is completed, the setting and parameter values of each detected hardware element are stored in the memory, and initialization of each hardware element is synchronously completed. Generally, when booted for the first time, the computer performs the POST, and stores a detection result in the memory, so that the detection result can be read directly and used subsequently.

Step S05: Transmit the setting and parameter values of each hardware element to the OS.

The setting and parameter values of each hardware element are transmitted to the OS 14, so that the user can browse or control the setting and parameter values of each hardware element through the OS 14 subsequently.

Step S06: Execute the OS.

A storage device inside the computer stores at least one OS, and only when the setting of each hardware element is correct, that is, the setting and parameter values of each detected hardware element are all correct, the system can execute the OS 14 to complete the boot process. The OS 14 here is a user interface installed in the computer, for example, a conventional OS such as a WINDOWS system or LINUX.

Step S07: Read the setting and parameter values of each hardware element that are stored in the memory last time, and initialize each hardware element.

During the judgment in Step S02, if the chassis 11 is not opened in the interval from the last boot time to the current boot time, it is considered that the hardware element in the chassis 11 is not changed. In this case, the BIOS 13 does not detect the hardware elements connected to the computer 10 to obtain the setting and parameter values of each hardware element, but read directly the setting and parameter values of each hardware element that are stored in the memory last time. That is, the POST is skipped, and the setting and parameter values of each hardware element that are stored in the memory after the previous POST are read directly. Then, Step S05 is performed to transmit the setting and parameter values of each hardware element to the OS, and Step S06 is performed to execute the OS, in order to complete the boot process. In this way, the step of scanning and detecting the hardware elements by the BIOS 13 is omitted, thereby shortening the boot time.

Please refer to FIG. 2 and FIG. 3, in which embodiment the memory is a volatile memory 12, and the auxiliary power source 15 is electrically connected to the volatile memory 12 through a sensing switch 16 provided on the chassis 11. In this embodiment, the auxiliary power source 15 is an independent power source and only used to supply power to the volatile memory 12; while the power of other electronic elements of the computer is supplied by a main power source (a cell or a transformer power source). Then, an open circuit or a closed circuit is formed between the auxiliary power source 15 and the volatile memory 12 by opening or closing the chassis 11. When the chassis 11 is opened, an open circuit is formed between the auxiliary power source 15 and the volatile memory 12. In this case, since the auxiliary power source 15 cannot supply power to the volatile memory 12, the setting and parameter values of each hardware element that are stored in the volatile memory 12 are deleted. By this means, after the computer 10 is started, it is first detected whether the volatile memory 12 stores the setting and parameter values of each hardware element, and if it is detected that the volatile memory 12 does not store the setting and parameter values of each hardware element, it is judged that the chassis is opened in the interval from the last boot time to the current boot time in Step S02.

Conversely, if the chassis 11 is not opened, the auxiliary power source 15 and the volatile memory 12 remain connected. Since the auxiliary power source 15 continuously supplies power to the volatile memory 12, the setting and parameter values of each hardware element that are stored in the volatile memory 12 are not deleted. In this case, after the computer 10 is started, likewise, it is first detected whether the volatile memory 12 stores the setting and parameter values of each hardware element, and if it is detected that the volatile memory 12 stores the setting and parameter values of each hardware element, it is judged that the chassis is not opened in the interval from the last boot time to the current boot time in Step S02.

In this embodiment, as shown in FIG. 2, the sensing switch 16 is provided at a switch side of the chassis 11 to form an open circuit or a closed circuit between the auxiliary power source 15 and the volatile memory 12 by opening or closing the chassis 11. The sensing switch 16 may be any switch capable of forming a closed circuit or an open circuit, such as an electromagnetic induction element, a physical switch, or a pressing switch, and the present invention is not limited thereto. The sensing switch 16, the auxiliary power source 15, and the volatile memory 12 form a closed loop. Therefore, after the chassis is opened, the sensing switch 16 is in an off-state, resulting in an open circuit between the auxiliary power source 15 and the volatile memory 12.

Figure 4:
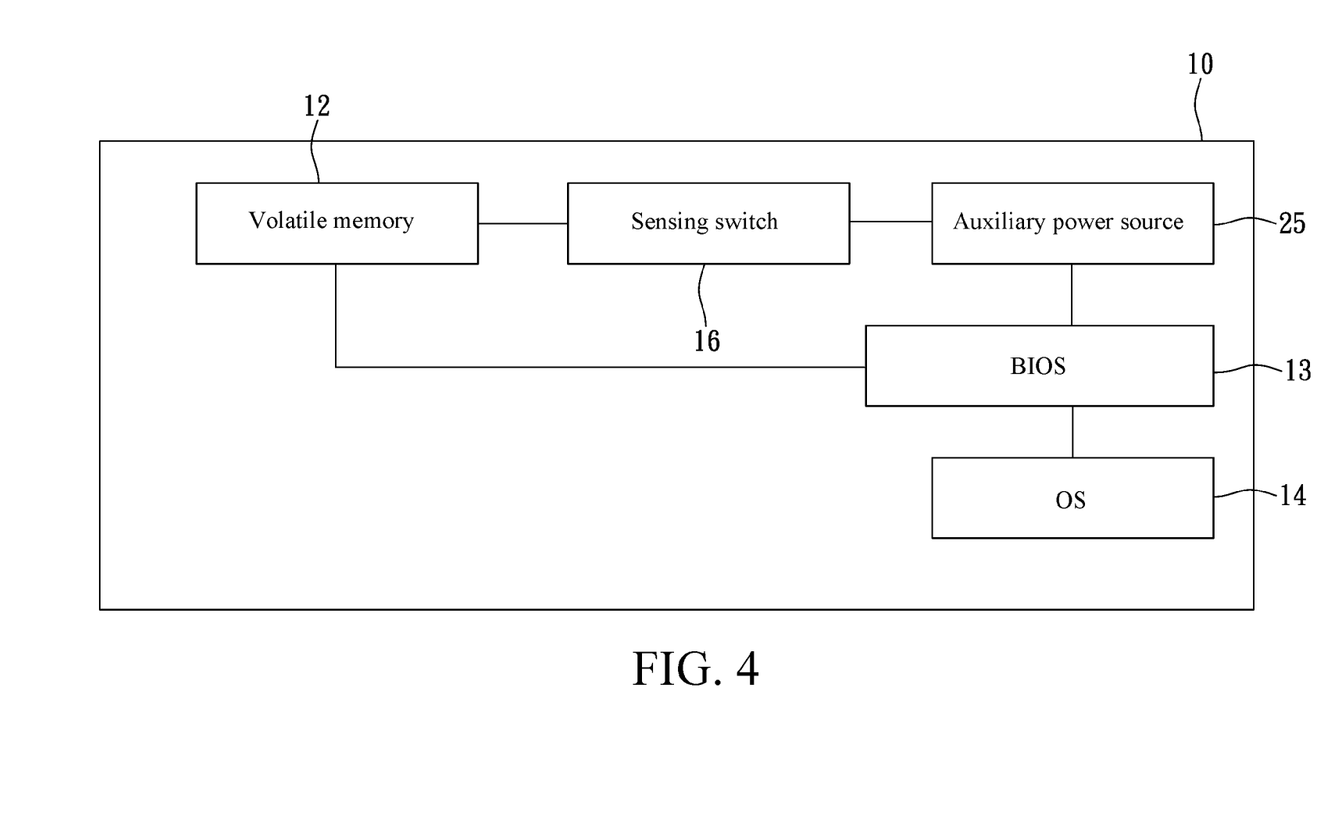
FIG. 4 is a schematic architectural view of a computer according to a second embodiment of the present invention.

Please refer to FIG. 2 to FIG. 4. FIG. 4 is a schematic architectural view of a computer according to a second embodiment of the present invention. This embodiment is applicable to a computer 10 with a BIOS 13 and an OS 14, the computer 10 including a chassis 11, a volatile memory 12, and an auxiliary power source 25. In the boot method of the computer system of this embodiment, the part identical to that in the first embodiment is not described herein again. Please refer to FIG. 1 and FIG. 4, in which the auxiliary power source 25 of this embodiment is an independent power source, which is used in an ordinary computer to supply power to the BIOS 13, thereby maintaining set values in the BIOS 13. By this means, an original power source apparatus in the computer 10 may be directly used, and an independent power source does not need to be additionally mounted.

As shown in FIG. 4, the volatile memory 12 is electrically connected to the BIOS 13, in order to provide setting and parameter values of each hardware element that are stored in the volatile memory 12 for the BIOS 13. The volatile memory 12 and the auxiliary power source 25 are electrically connected to each other through a sensing switch 16, so that the auxiliary power source 25 supplies power to the volatile memory 12. Likewise, when the chassis 11 is opened, the sensing switch 16 forms an open circuit between the auxiliary power source 15 and the volatile memory 12. In this case, the setting and parameter values of each hardware element that are stored in the volatile memory 12 may be deleted. In addition, since the sensing switch 16 is provided between the auxiliary power source 25 and the volatile memory 12, the power supply from the auxiliary power source 25 to the BIOS 13 is not affected.

Figure 5:
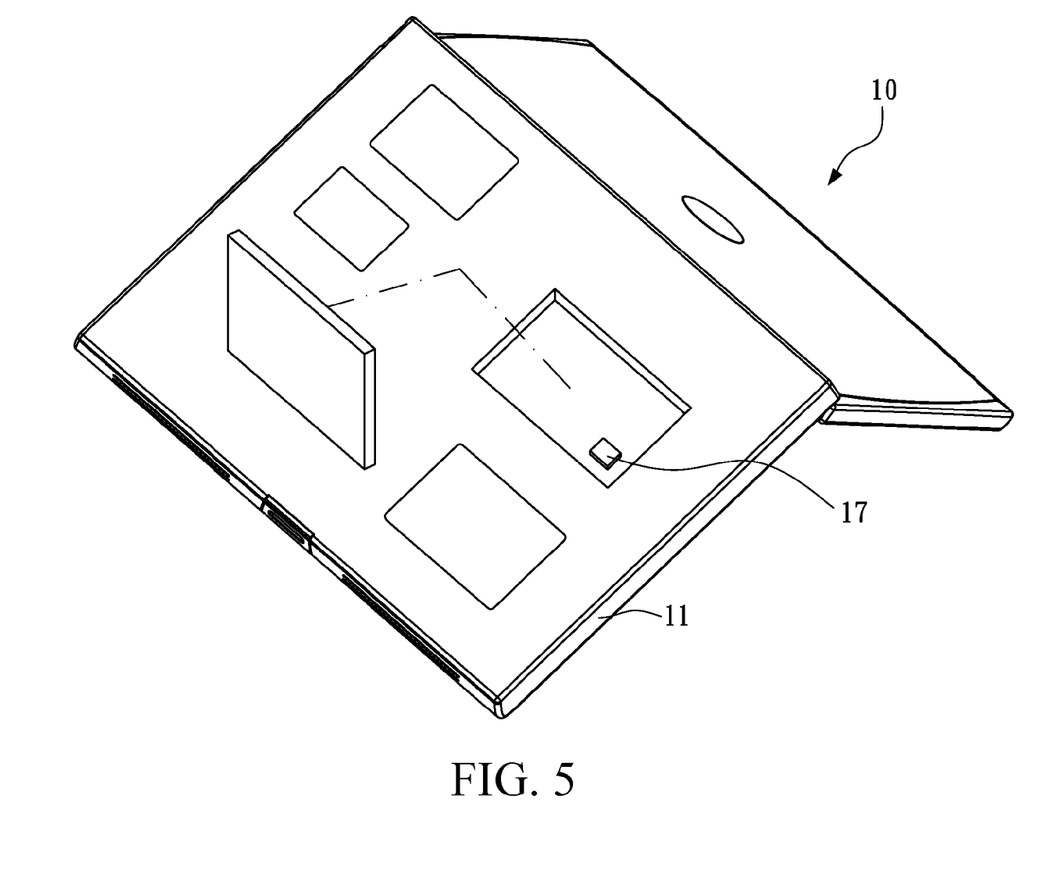
FIG. 5 is a rear view of a computer according to a third embodiment of the present invention.
Figure 6:
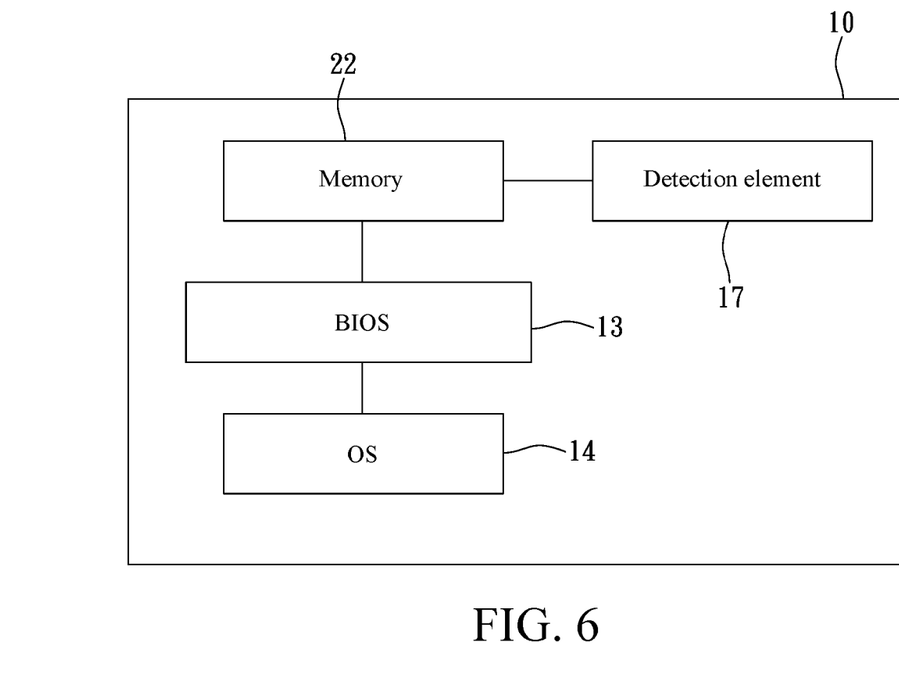
FIG. 6 is a schematic architectural view of the computer according to the third embodiment of the present invention.

Please refer to FIG. 5 and FIG. 6. FIG. 5 is a rear view of a computer according to a third embodiment of the present invention, and FIG. 6 is a schematic architectural view of the computer in this embodiment. This embodiment is applicable to a computer 10 with a BIOS 13 and an OS 14, the computer 10 including a chassis 11, a memory 22, and a detection element 17. In the boot method of the computer system of this embodiment, the part identical to that in the first embodiment is not described herein again. Please refer to FIG. 1, FIG. 5 and FIG. 6, in which embodiments, the detection element 17 is provided on the chassis 11 and is electrically connected to the memory 22. When the chassis 11 is opened, the detection element 17 transmits detection information to the memory 22 for storage. The detection element 17 may be a micro-current detection switch, used to convert the current change into detection information and transmit the detection information to the memory 22 for storage, but the present invention is not limited thereto. After the computer is started, by detecting whether the memory 22 stores a detection signal, it is judged whether the chassis 11 is opened in an interval from the last boot time to the current boot time. When it is detected that the memory 22 stores the detection information, it is judged that the chassis is opened in the interval from the last boot time to the current boot time in Step S02.

If the chassis 11 is not opened, the detection element 17 does not transmit any information to the memory 22. Therefore, in Step S02 shown in FIG. 1, when it is detected that the memory 22 does not store the detection information, it is judged that the chassis is not opened in the interval from the last boot time to the current boot time.

Figure 7:
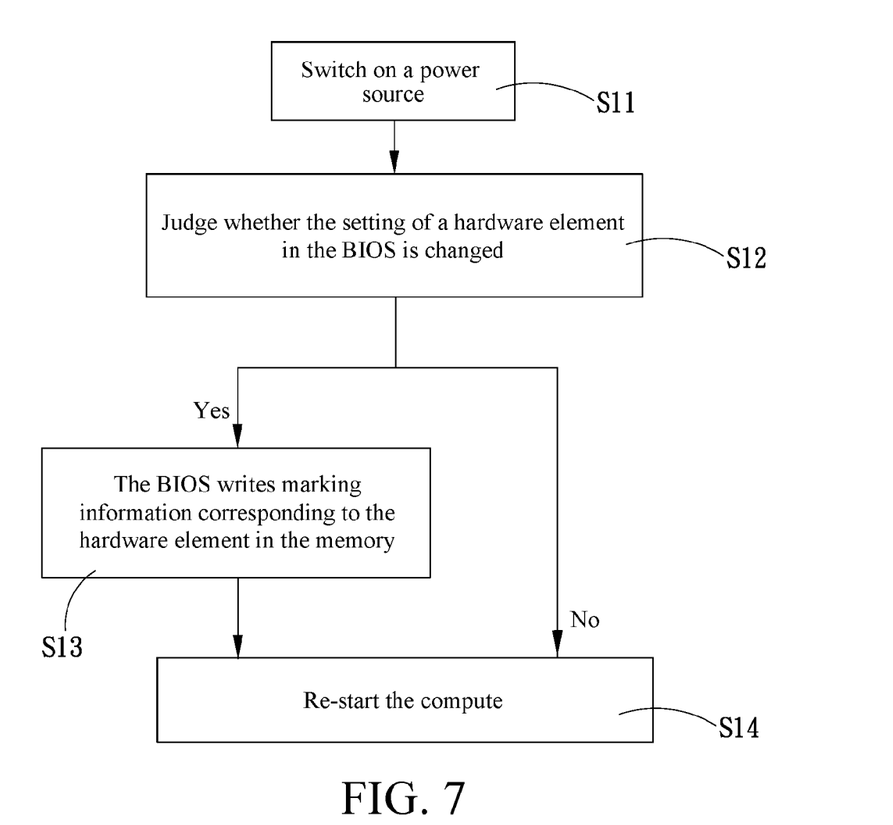
FIG. 7 is a flow chart of a BIOS marking method of a computer system according to a fourth embodiment of the present invention.
Figure 8:
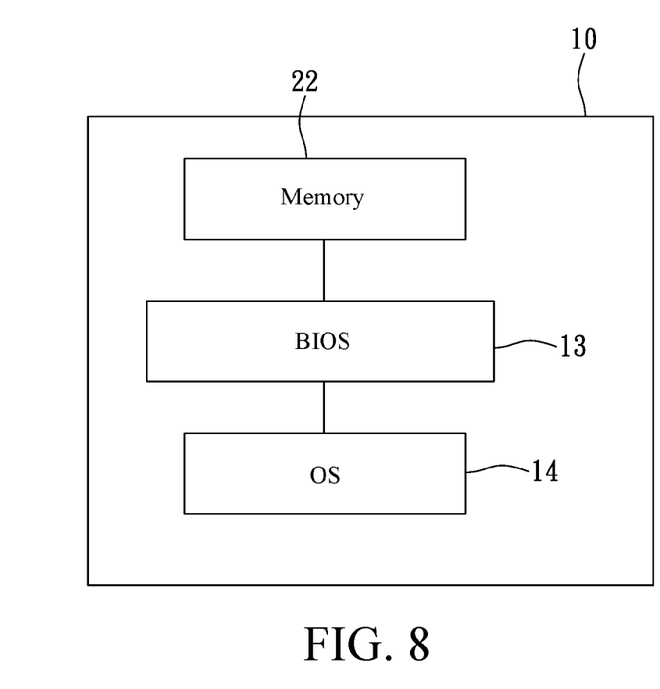
FIG. 8 is a schematic architectural view of a computer according to the fourth embodiment of the present invention.

Please refer to FIG. 7 and FIG. 8. FIG. 7 is a flow chart of a BIOS marking method of a computer system according to a fourth embodiment of the present invention, and FIG. 8 is a schematic architectural view of a computer in this embodiment. The disclosed method of this embodiment is applicable to a computer 10 with a BIOS 13 and an OS 14, the computer 10 including a memory 22. The method includes the following steps.

Step S11: Switch on a power source.

A power button of the computer 10 is pressed to switch on the power source, so that the power source supplies power to each hardware apparatus for operation.

Step S12: Judge whether the setting of a hardware element in the BIOS is changed.

After the power source is switched on, the computer 10 first judges whether the setting of any hardware element in the BIOS 13 is changed. If the setting of any hardware element in the BIOS 13 of the computer 10 is changed, Step S13 is performed. If the setting of no hardware element in the BIOS 13 of the computer 10 is changed, Step S14 is performed.

Step S13: The BIOS writes marking information corresponding to the hardware element in the memory.

When the setting of the hardware element in the BIOS 13 is changed, the BIOS 13 writes marking information corresponding to the hardware element in the memory 22. In this embodiment, a manner of writing marking information in the memory 22 may include: establishing a memory table corresponding to each hardware element in the memory 22, and after the setting of any hardware element in the BIOS 13 is changed, writing marking information in the memory table at a position corresponding to the hardware element.

Step S14: Re-start the computer.

After entering a setting system in the BIOS 13, no matter whether the hardware element is changed or not, the computer needs to be re-started to execute a normal boot process.

In a normal use state, the BIOS is rarely changed. Even if a setting interface of the BIOS is entered, it is unnecessary to change the setting and parameter values of the hardware element. However, after withdrawing from the setting interface of the BIOS and re-entering a boot process, it usually takes a lot of time to perform hardware re-scanning and re-detection, so that the boot time is longer than that acceptable to a user, and the start speed of the computer is limited and cannot be effectively increased. If the marking information corresponding to the changed hardware element is written into the memory through the BIOS marking method, when a boot process is re-entered, the time spent in scanning and detecting all the hardware elements by the BIOS is reduced, in order to shorten the boot time.

Figure 9:
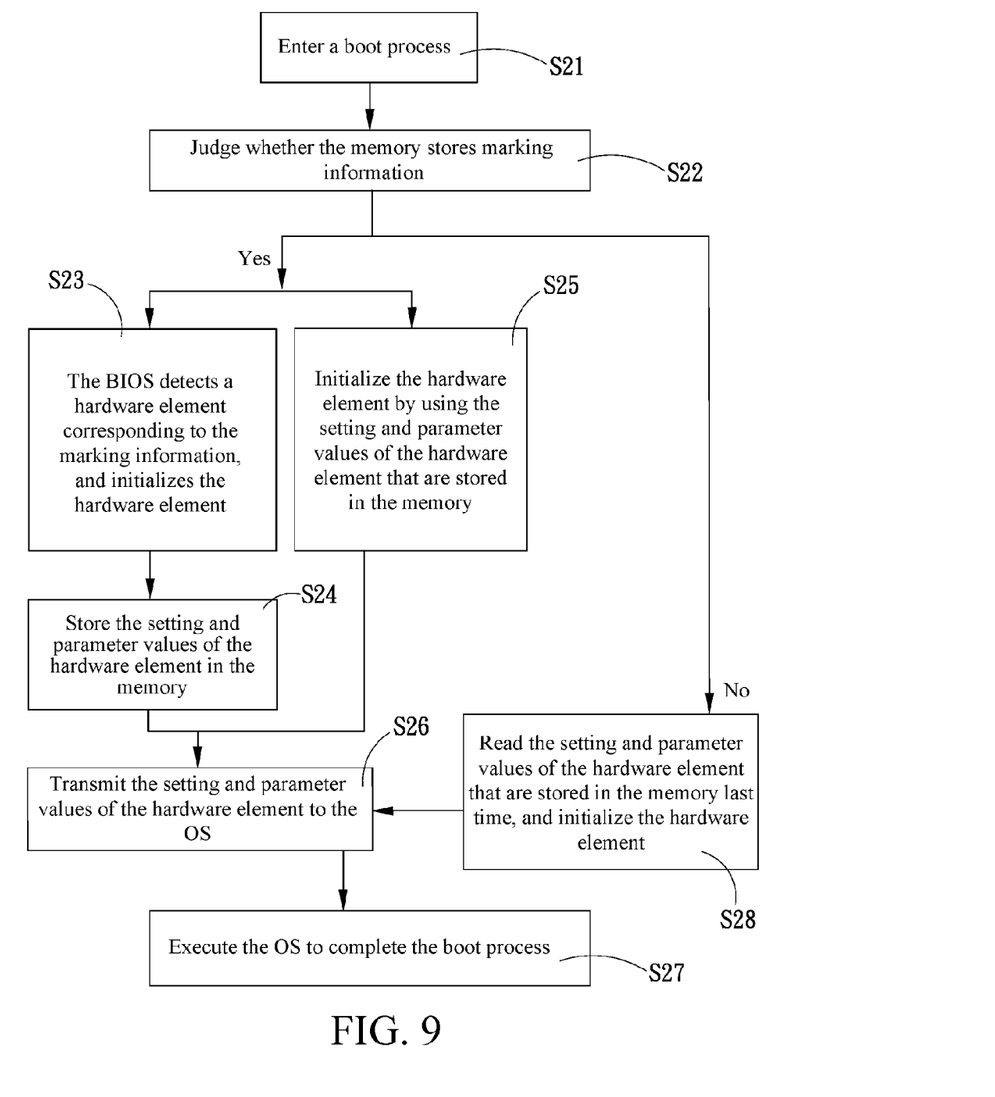
FIG. 9 is a flow chart of a boot method of a computer system according to a fifth embodiment of the present invention.

FIG. 9 is a flow chart of a boot method of a computer system according to a fifth embodiment of the present invention. Please refer to FIG. 8 and FIG. 9, in which the disclosed method of this embodiment is applicable to a computer 10 with a BIOS 13 and an OS 14 on the basis of the marking method in the fourth embodiment, the computer 10 including a memory 22. The method includes the following steps.

Step S21: Enter a boot process.

A power button of the computer 10 is pressed to switch on the power source, so that the power source supplies power to each hardware apparatus for operation, and a boot process is entered. Alternatively, after a setting interface of the BIOS 13 is entered, the boot process is re-entered.

Step S22: Judge whether the memory stores marking information.

After entering the boot process, the computer 10 first judges whether the memory 22 stores marking information. Through the description in the fourth embodiment, it is judged whether any marking information is written into the memory table in the memory 22. If marking information is written into the memory 22 of the computer 10, Step S23 or Step S25 is performed. If no marking information is written into the memory 22 of the computer 10, Step S28 is performed.

Step S23: The BIOS detects a hardware element corresponding to the marking information, and initializes the hardware element.

If the marking information is written into the memory 22, the BIOS 13 detects the hardware element corresponding to the marking information, in order to obtain setting and parameter values of the hardware element and initialize the hardware element. Here, only the hardware element corresponding to the marking information in the memory 22 is detected, in order to obtain the setting and parameter values of the hardware element.

Step S24: Store the setting and parameter values of the hardware element in the memory.

After Step S23 is completed, the setting and parameter values of the detected hardware element are stored in the memory. Here, the stored setting and parameter values of the hardware element are specific to the hardware element corresponding to the marking information written in the memory 22, and are not specific to all the hardware elements.

Step S25: Initialize the hardware element by using the setting and parameter values of the hardware element that are stored in the memory.

The marking information is written into the memory 22, but not all the hardware elements are changed, and the corresponding marking information is written into the memory. For the hardware element not corresponding to the marking information in the memory 22, the BIOS 13 adopts the setting and parameter values that are stored in the memory 22 last time. Therefore, in Step S25, for the hardware element not corresponding to the marking information, the setting and parameter values of the hardware element that are stored in the memory 22 last time are adopted, and the hardware element is initialized by using the setting and parameter values. In this way, the BIOS 13 only detects the hardware element whose setting is changed, while does not detect the hardware element whose setting is not changed, and only reads the setting and parameter values that are stored in the memory 22 last time, thereby reducing the boot time required by the BIOS 13 and accelerating the boot process.

Step S26: Transmit the setting and parameter values of the hardware element to the OS.

The setting and parameter values of the hardware element are transmitted to the OS 14, so that the user can browse or control the setting and parameter values of the hardware element through the OS 14 subsequently.

Step S27: Execute the OS to complete the boot process.

A storage device inside the computer stores at least one OS, and only when the setting of each hardware element is correct, that is, the setting and parameter values of each detected hardware element are all correct, the system can execute the OS 14 to complete the boot process. The OS 14 here is a user interface installed in the computer, for example, a conventional OS such as a WINDOWS system or LINUX.

Step S28: Read the setting and parameter values of the hardware element that are stored in the memory last time, and initialize the hardware element.

During the judgment in Step S22, if no marking information is written into the memory 22, it is considered that the setting of the hardware element in the BIOS 13 is not changed. In this case, the BIOS 13 does not detect the hardware elements connected to the computer 10 to obtain the setting and parameter values of each hardware element, but initializes each hardware element by using the setting and parameter values of each hardware element that are stored in the memory last time. That is, the POST is skipped, and the setting and parameter values of each hardware element that are stored in the memory 22 after the previous POST are read directly. Then, Step S26 is performed to transmit the setting and parameter values of each hardware element to the OS, and Step S27 is performed to execute the OS, in order to complete the boot process. In this way, the step of scanning and detecting the hardware elements by the BIOS 13 is omitted, thereby shortening the boot time.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A boot method of a computer system, applicable to a computer with a Basic Input/Output System (BIOS) and an Operating System (OS), wherein the computer comprises a chassis and a memory, wherein the memory is a volatile memory, the computer further comprises an auxiliary power source electrically connected to the volatile memory, and the boot method of the computer system comprises:

after the computer is started, judging whether the chassis is opened in an interval from the last boot time to the current boot time;

if the chassis is opened in the interval from the last boot time to the current boot time, the BIOS detecting hardware elements connected to the computer to obtain setting and parameter values of each hardware element, initializing each hardware element, storing the setting and parameter values of each hardware element in the memory, and transmitting the setting and parameter values of each hardware element to the OS;

if the chassis is not opened in the interval from the last boot time to the current boot time, the BIOS initializing each hardware element by using the setting and parameter values of each hardware element, that are stored in the memory previously, and transmitting the setting and parameter values of each hardware element to the OS; and forming an open circuit or a closed circuit between the auxiliary power source and the volatile memory by opening or closing the chassis.

2. The boot method of the computer system according to claim 1, further comprising:

after the computer is started, detecting whether the volatile memory stores the setting and parameter values of each hardware element connected to the computer; and if it is detected that the volatile memory does not store the setting and parameter values of each hardware element, judging that the chassis is opened in the interval from the last boot time to the current boot time.

3. The boot method of the computer system according to claim 1, wherein the computer further comprises a detection element provided on the chassis and electrically connected to the memory, and the boot method of the computer system further comprises:

before the computer is started, when the chassis is opened, the detection element transmitting a detection signal to the memory for storage.

4. The boot method of the computer system according to claim 3, further comprising:

after the computer is started, detecting whether the memory stores the detection signal, in order to judge whether the chassis is opened in the interval from the last boot time to the current boot time; and if the memory stores the detection signal, judging that the chassis is opened in the interval from the last boot time to the current boot time.

5. A computer device, used to execute the boot method of the computer system according to claim 1.

6. A computer device, used to execute the boot method of the computer system according to claim 2.

7. A computer device, used to execute the boot method of the computer system according to claim 3.

8. A computer device, used to execute the boot method of the computer system according to claim 4.

9. A boot method of a computer system, applicable to a computer with a Basic Input/Output System (BIOS) and an Operating System (OS), wherein the computer comprises a memory, and the boot method of the computer system comprises:

after the computer is started, judging whether a setting of a first hardware element in the BIOS is changed;

if the setting of the first hardware element is changed, the BIOS writing marking information corresponding to the first hardware element in the memory;

after entering a boot process, judging whether the memory stores the marking information;

if the memory stores the marking information,
the BIOS detecting the first hardware element corresponding to the marking information to obtain setting and parameter values of the first hardware element, initializing the first hardware element, and storing the setting and parameter values of the first hardware element in the memory, and for a second hardware element not corresponding to the marking information, the BIOS initializing the second hardware element by using setting and parameter values of the second hardware element that are stored in the memory previously, and transmitting the setting and parameter values of the second hardware element to the OS; and if the memory does not store the marking information, the BIOS initializing the first hardware element by using the setting and parameter values of the first hardware element, that are stored in the memory previously, and transmitting the setting and parameter values of the first hardware element to the OS.

10. A computer device, used to execute the boot method of the computer system according to claim 9.

* * * * *